Aug. 27, 1957      G. D. HUNTER      2,804,034
TRACTOR MOUNTED IMPLEMENT

Filed Aug. 30, 1955      2 Sheets-Sheet 1

INVENTOR.
GEORGE D. HUNTER
BY
ATTORNEYS

Aug. 27, 1957    G. D. HUNTER    2,804,034
TRACTOR MOUNTED IMPLEMENT
Filed Aug. 30, 1955    2 Sheets-Sheet 2

INVENTOR.
GEORGE D. HUNTER
BY
Roger C. Johnson
ATTORNEYS

United States Patent Office 2,804,034
Patented Aug. 27, 1957

2,804,034

TRACTOR MOUNTED IMPLEMENT

George D. Hunter, Des Moines, Iowa, assignor to Deere Manufacturing Co., Dubuque, Iowa, a corporation of Iowa Application August 30, 1955, Serial No. 531,545

5 Claims. (Cl. 111—7)

The present invention relates generally to agricultural machines, and more particularly to machines for distributing liquid fertilizer and the like.

The object and general nature of the present invention is a provision of the fertilizer distributor particularly adapted for easy and quick attachment to a conventional farm tractor, with new and improved means for changing the depth of penetration of the soil-entering tools and for raising and lowering the latter into and out of transport and working positions.

More specifically, it is an important feature of this invention to provide a fertilizer distributor in which a main frame, preferably carrying the fertilizer tank, is arranged for limited vertical movement on the tractor, with tool means that is swingably connected with the frame for generally vertical movement through a generally large extent, so as to be able to swing the tools into a transport position in which they will not catch on trash and the like, said fertilizer being also provided with means for shifting the frame relative to the tractor when the tool means is in its ground-entering position, for the purpose of making adjustments in the depth of penetration of the tool means, the extent of movement of which adjustment is fairly small, as compared with the movement of the tool means from transport to working position and vice versa. It is also a feature of this invention to provide a fertilizer distributor in which the fertilizer tank may be mounted closely behind the operator's seat on the tractor so that the aforesaid limited movement of the frame and tank is accommodated while retaining clear visibility over the tank and with minimum overhang. It is also important to be able to shift the tool means from operating position to a full transport position independently of the position of the frame, whereby the depth adjustment secured by the proper position of the frame relative to the tractor is not lost when changing from transport to working position and vice versa.

These and other objects and advantages of the present invention will be apparent to those skilled in the art after a consideration of the following detailed description, taken in conjunction with the accompanying drawings, in which.

Figure 1:
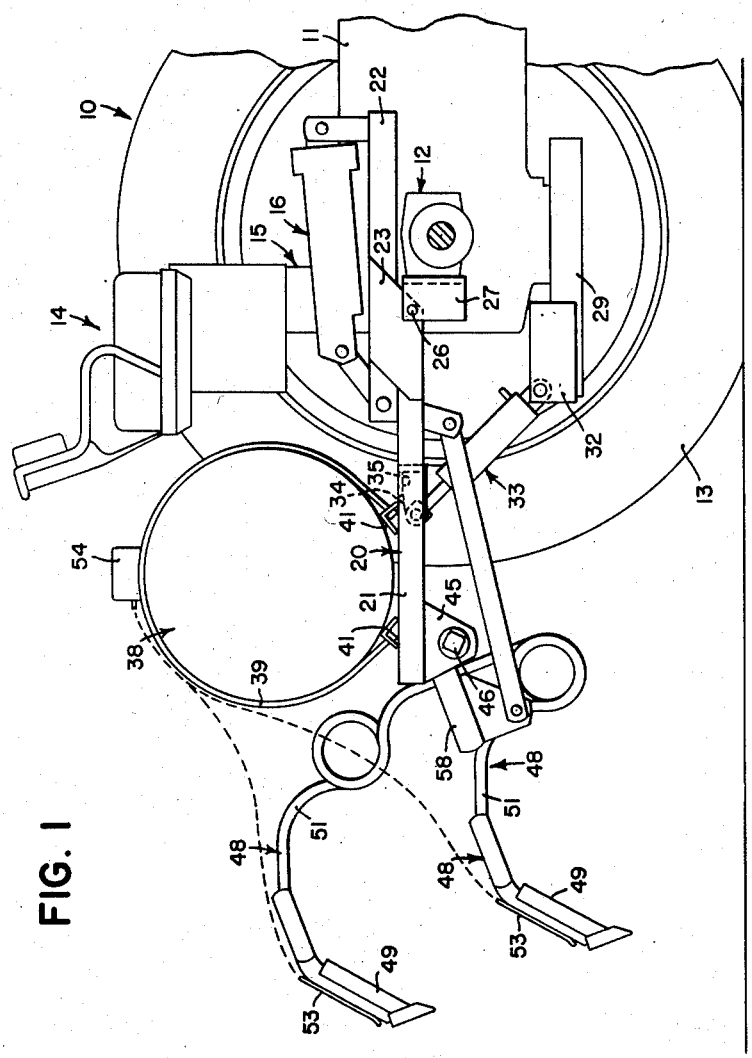
Fig. 1 is a side view of a tractor mounted fertilizer distributor in which the principles of the present invention have been incorporated, the ground-entering tool means being shown in their transport position.

Referring first to Fig. 1, the tractor 10 is illustrated as being of generally conventional construction, embodying a main frame and transmission housing 11, the rear portion of which includes a rear axle structure 12 on the axles of which rear drive wheels 13 are disposed. Also mounted on the rear of the tractor is an operator's station 14 mounted adjacent or over a power-lift unit 15 which includes means for controlling the operation of a hydraulic ram indicated at 16.

The fertilizer distributor is shown as including a generally horizontally disposed main frame 20 having a generally rectangular rear section 21 and a pair of forward sections 22, one at each side of the tractor, suitably interconnected by a bracket or plate means 23 to which the frame sections 21 and 22 are suitably connected, as by welding or the like. The plate members or brackets 23 are pivotally mounted, as at 26, on a pair of angle brackets 27 fixed in any suitable way to the rear axle housings 12 at opposite sides of the tractor. The tractor 10 also includes a lower rear drawbar support 29 to the rear portion of which a pair of brackets 32 are connected, there being a bracket 32 at each side of the tractor, and a pair of adjusting units 33, each shown as comprising a hydraulic cylinder and piston unit, is connected between the drawbar support brackets 32 and the frame 21. Preferably, the upper end of each hydraulic unit 33 has its piston section connected to a rearwardly extending bracket 34 fixed to a cross angle 35 that is disposed adjacent the forward portion of the rear frame section 21. A fertilizer tank is shown at 38 and is secured to the rear frame section 21 by any suitable means, such as a pair of clamping rods 39 connected at their ends to angle members 41 that are secured to and form a part of the frame section 21.

Figure 2:
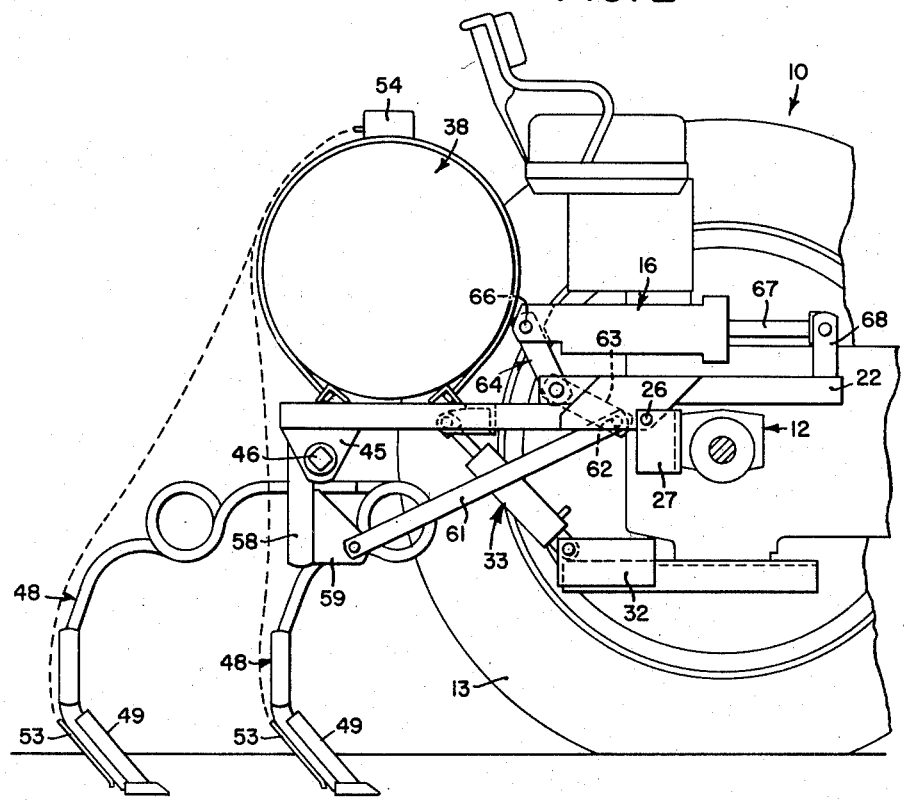
Fig. 2 is a view similar to Fig. 1, showing the tool means in their operating or soil-entering position.

At the rear of the rear frame section 21 two or more brackets 45 are disposed, these brackets forming a pivotal support for a cross shaft 46 that forms tool-receiving means. Secured to the shaft 46, preferably between the brackets 45 and underneath the rear portion of the frame section 21 and the tank 38, is a plurality of soil-engaging tools 48, each including a soil penetrating knife or runner 49 carried by a suitable standard 51 and fixed at its upper end to the associated shaft 46 so as to be swung in a generally vertical direction whenever the shaft 46 is rocked. In Fig. 1 the tools 48 are shown in their transport position, in which the forward or lowermost runners 49 are disposed well above the surface of the ground. Fig. 2 shows these parts when they are swung downwardly and forwardly into their working or soil-entering position. Suitable conduit means is connected with each tool 49, as indicated at 53, and extends from the tools or runners 49 upwardly to a pressure control unit 54 on the tank 38.

Means is provided for control of the rocking of tools 48 between working and transport positions, and to this end, an arm 58 is fixed to the shaft 46 and carries a bracket 59 to which a forwardly extending link 61 is pivotally connected. The forward end of the link 61 is pivotally connected, as at 62, with the lower end 63 of a lever 64 that is swingably mounted on the rear portion of the forward frame section 22. The upper end of the lever 64 is pivotally connected, as at 66, to the adjacent end of the power cylinder 16 mentioned above. The piston rod of the cylinder, shown at 67, is connected to a bracket 68 that is fixed to the forward portion of the associated frame 22.

The operation of the implement as so far described is substantially as follows.

Referring first to Fig. 2, the tools 48 are shown in their soil penetrating or working position, and it will be seen that this depth of operation may be varied, as desired, by extending or retracting the adjusting units 33 described above. Since there is substantially no occasion to vary the depth of operation more than a few inches, it can be seen that the frame-carried tank 38 can be disposed generally below and fairly closely adjacent the operator's seat 14 since there is no need to shift the frame 20 more than the relatively small amount just mentioned. However, when it is desired to shift the tool means 48 out of the operating position and into a transport position, in which clearance relative to the surface of the ground is important, by operating the power unit 16, the tools 48 can be swung rearwardly and upwardly to a substantial extent, as shown in Fig. 1, so as to secure the desired ground clearance but without losing the depth adjustment as established by the frame-shifting means 33.

Figure 3:
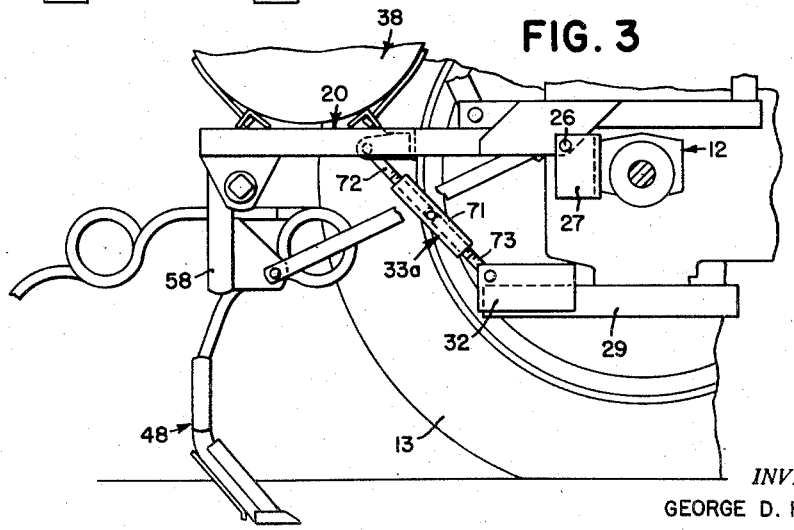
Fig. 3 is a view similar to Fig. 2, showing a different way of adjusting the frame to secure depth adjustment.

Since the depth of operation is something that is not ordinarily changed very often, where the tractor 10 does not have an operating unit in the form of a cylinder or cylinders 33, it may be preferable to employ a simple turnbuckle unit, shown at 33a in Fig. 3, for the purpose of raising and lowering the frame 20 relative to the tractor so as to raise and lower the tool means 48. As shown in Fig. 3, the turnbuckle 33a is of generally conventional construction, employing a barrel member 71 and two journaled end members 72 and 73 pivotally connected, respectively, to the frame 20 and the tractor drawbar support 29.

While I have shown and described above the preferred structure in which the principles of the present invention have been incorporated, it is to be understood that my invention is not to be limited to the particular details, shown and described, but that, in fact, widely different means may be employed in the practice of the broader aspects of my invention.

What I claim, therefore, and desire to secure by Letters Patent is:

1. A tractor mounted liquid fertilizer distributor comprising a tank-supporting frame, a tank carried thereby, means to movably connect said frame with the tractor for generally vertical movement relative thereto, soil-entering tool means carried by said frame for generally vertical movement between transport and ground-entering position, conduit means connecting said tank with said soil-entering tool means, means carried by said frame and connected with said tool means to move the latter between transport and working positions, and means acting against said frame to raise and lower the latter so as to change the depth of operation of said tool means.

2. The combination with a tractor having a rear axle and a rear drawbar support, of a liquid fertilizer distributor comprising a frame pivotally connected at its forward portion to the tractor axle, a tank mounted on the rear portion of the frame, soil-entering tool means pivoted to the rear end of said frame and swingable relative to the latter into and out of transport and soil-entering positions, conduit means connecting said tank with said tool means, means carried by said frame and said tool means for swinging the latter into their transport position, and means connected between said frame and said drawbar support for raising and lowering the frame to adjust the working depth of said tool means when the latter are in their soil-entering position.

3. The combination with a tractor having a rear axle and a rear drawbar support, of a liquid fertilizer distributor comprising a frame pivotally connected at its forward portion to the tractor axle, a part of said frame extending forwardly over the tractor rear axle, a tank supported on said frame rearwardly of said part, a transverse shaft rockably supported on the rear portion of said frame, soil-entering tool means connected with said shaft and swung by the latter into and out of transport and soil-entering positions, conduit means connecting said tank with said tool means, means carried by said frame and acting between the forward portion of said frame part and said tool means for swinging said shaft, and means connected between said frame and said drawbar support for raising and lowering the frame to adjust the working depth of said tool means when the latter are in their soil-entering position.

4. The combination with a tractor having a rear axle and an operator's seat adjacent the rear of the tractor and disposed generally above the rear axle, of a liquid fertilizer distributor comprising a pair of brackets attached to the rear axle, a frame disposed generally rearwardly of said rear axle and pivoted to said brackets for limited vertical swinging, a tank carried by said frame adjacent but spaced from said operator's seat, soil-entering tool means pivotally carried by said frame adjacent the rear thereof and generally underneath said tank, conduit means connecting said tool means with said tank, said tool means being swingable upwardly and rearwardly from a lower or soil-entering position, means carried by said frame for swinging said tool means, and means connected to act between said frame and the tractor for raising and lowering said frame, tank and tool means through a relatively small distance to vary the depth of operation of said tool means when in their soil-entering position.

5. The combination with a tractor having a rear axle and an operator's seat adjacent the rear of the tractor and disposed generally above the rear axle, of a liquid fertilizer distributor comprising a pair of brackets attached to the rear axle, a frame comprising a forward part and a rear part fixedly interconnected by plate means, pivot means connecting said plate means with said rear axle brackets so that the rear part of said frame extends rearwardly from the rear axle and the front part extends over the rear axle with space between the axle and front part to provide for a limited amount of generally vertical movement of the frame relative to the tractor, a tank carried by the rear part of said frame adjacent but spaced from said operator's seat, soil-entering tool means pivotally carried by the rear part of said frame adjacent the rear thereof and generally underneath said tank, conduit means connecting said tool means with said tank, said tool means being swingable upwardly and rearwardly from a lower or soil-entering position, a lever pivotally mounted on said frame in a generally vertical position, a power unit connected between the upper end of said lever and the forward portion of said front frame part for swinging said lever, link means connecting a lower part of said lever with said tool means for swinging said tool means, and means connected to act between said frame and the tractor for raising and lowering said frame, tank and tool means through a relatively small distance to vary the depth of operation of said tool means when in their soil-entering position.

References Cited in the file of this patent
UNITED STATES PATENTS

| | | |
|---|---|---|
| 2,429,841 | Phillips | Oct. 28, 1947 |
| 2,678,508 | Reuter et al. | May 18, 1954 |
| 2,680,624 | Pool et al. | June 8, 1954 |